United States Patent [19]

Bremer et al.

[11] Patent Number: 5,506,866
[45] Date of Patent: Apr. 9, 1996

[54] SIDE-CHANNEL COMMUNICATIONS IN SIMULTANEOUS VOICE AND DATA TRANSMISSION

[75] Inventors: Gordon Bremer, Clearwater; Kurt E. Holmquist, Largo; Kenneth D. Ko, Clearwater; Keith A. Souders, Tampa, all of Fla.

[73] Assignee: AT&T Corp., Murray Hill, N.J.

[21] Appl. No.: 151,686

[22] Filed: Nov. 15, 1993

[51] Int. Cl.⁶ .................................................. H04J 11/00
[52] U.S. Cl. .................................. 375/216; 370/20
[58] Field of Search ............................. 375/226, 261; 370/20, 110.1, 110.4

[56] References Cited

U.S. PATENT DOCUMENTS

| | | | |
|---|---|---|---|
| 4,558,317 | 12/1985 | Armstrong | 340/825.06 |
| 4,578,537 | 3/1986 | Faggin et al. | 179/2 DP |
| 4,627,077 | 12/1986 | Armstrong | 370/110.4 |
| 4,630,287 | 12/1986 | Armstrong | 370/110.4 |
| 4,736,377 | 4/1988 | Bradley et al. | 371/37 |
| 4,757,495 | 7/1988 | Decker et al. | 370/76 |
| 4,899,384 | 2/1990 | Crouse et al. | 381/31 |
| 5,023,903 | 6/1991 | Bowen | 379/67 |
| 5,036,513 | 7/1991 | Greenblatt | 370/125 |
| 5,099,478 | 3/1992 | Bremer et al. | 370/100.1 |
| 5,105,443 | 4/1992 | Betts et al. | 370/110.4 |
| 5,136,586 | 8/1992 | Greenblatt | 370/110.4 |
| 5,144,295 | 9/1992 | Nakagawa et al. | 370/110.4 |
| 5,228,033 | 7/1993 | Okouchi | 370/84 |
| 5,436,390 | 7/1995 | Bremer et al. | 375/295 |
| 5,448,555 | 9/1995 | Bremer et al. | 370/20 |

FOREIGN PATENT DOCUMENTS

| | | | |
|---|---|---|---|
| 0490552 | 6/1992 | European Pat. Off. | H04L 27/34 |
| 2210237 | 6/1989 | United Kingdom | H04L 5/12 |

*Primary Examiner*—Stephen Brinich
*Attorney, Agent, or Firm*—J. J. Opalach; J. J. Trainor

[57] ABSTRACT

In a simultaneous voice and data communication system, a stream of signal points is partitioned into a plurality of symbol blocks, each symbol block including a data segment and a control segment. The data segment carries information from a user, i.e., user data, while the control segment provides control information. A voice signal is then added to at least a portion, or all, of the signal points of each symbol block to provide for simultaneous voice and data transmission to an opposite endpoint. The control information may represent information from a secondary data source, and/or may include information about the characteristics of the succeeding block, e.g., the user data rate, and information pertaining to characteristics of the communications channel.

50 Claims, 6 Drawing Sheets

FIG. 4A
CONSTELLATION A
TWO BITS PER SYMBOL
4800 bps

FIG. 4B
CONSTELLATION B
THREE BITS PER SYMBOL
7200 bps

FIG. 4C
CONSTELLATION C
FOUR BITS PER SYMBOL
9600 bps

FIG. 4D
CONSTELLATION D
FIVE BITS PER SYMBOL
12000 bps

FIG. 4E
CONSTELLATION E
SIX BITS PER SYMBOL
14400 bps

SIDE-CHANNEL COMMUNICATIONS IN SIMULTANEOUS VOICE AND DATA TRANSMISSION

BACKGROUND OF THE INVENTION

The present invention relates to data communications equipment and, more particularly, to the use of a side-channel in a simultaneous voice and data communications system.

The co-pending, commonly assigned, U.S. Patent application of Gordon Bremer and Kenneth D. Ko entitled "Simultaneous Analog and Digital Communication," Ser. No. 08/076505, now U.S. Pat. No. 5,448,555, issued Sep. 5, 1995, filed on Jun. 14, 1993, describes a simultaneous voice and data communications system in which a voice signal is added to a data signal for transmission over a communications channel to a receiving modem.

In this simultaneous analog and digital communication system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice signal vector are then added together to select a resultant N-dimensional signal point, which is then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

Using this above-mentioned technique to simultaneously transmit voice and data, there is sometimes a need to transmit additional information separate and apart from the voice and data information. For example, the co-pending, commonly assigned, U.S. patent application of Gordon Bremer, Kenneth D. Ko, Luke J. Smithwick, and Edward S. Zuranski, entitled "Autorate Method for Simultaneous Transmission of Voice and Data," Ser. No. 08/076,525, filed on Jun. 21, 1993, now abandoned, describes that a "silence indicator" message can be additionally transmitted on a secondary, or side-channel, as is known in the art, where this side-channel is separate and apart from the simultaneous voice and data transmission.

SUMMARY OF THE INVENTION

In accordance with the invention, we have realized an advantageous side-channel technique wherein the side-channel is multiplexed with the data signal, and the resultant multiplexed signal is then added to the analog, e.g., voice, signal to provide simultaneous voice and data transmission.

In an embodiment of the invention, a simultaneous voice and data modem partitions a stream of symbols into a plurality of symbol blocks, each symbol block including a data segment and a control segment. In a "data-mode" of operation, the data segment carries information from a user to an opposite endpoint, i.e., user data, while the control segment provides control information. In a "data-and-analog" mode of operation, an analog signal, e.g., a voice signal, is then added to at least a portion, or all, of the symbols of each symbol block to provide for simultaneous voice and data transmission to the opposite endpoint.

In accordance with a feature of the invention, this control information may represent any additional information. For example, this control information may represent information from a secondary data source, and/or may include information about the characteristics of a succeeding block—like the user data rate, and information pertaining to characteristics of the communications channel.

Also, the use of a symbol block makes it possible to send "raw" asynchronous data from a data terminal without sending the start and stop bits. This is possible because the framing provided by the symbol block is used to preserve the character boundaries so that these boundaries can be properly reconstructed at the receiving end of the data connection. As a result, there is no need to transmit the start and stop bits—which effectively increases the available data bandwidth by 25%.

DETAILED DESCRIPTION

Figure 1:
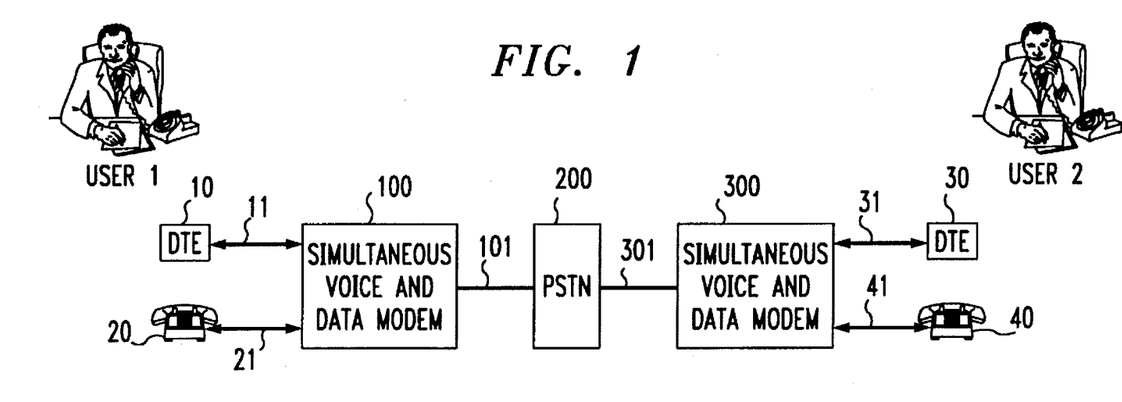
FIG. 1 shows a block diagram of a simultaneous voice and data communications system embodying the principles of the invention.

A block diagram of a simultaneous voice and data communications system is shown in FIG. 1. In the description that follows it is assumed that a communications path has already been established between user 1 and user 2 of FIG. 1. The communications equipment of user 1 includes data terminal equipment (DTE) 10, telephone 20, and simultaneous voice and data (SVD) modem 100. The latter receives two types of signals for transmission to SVD modem 300—a data signal from DTE 10 and a voice signal from telephone 20. SVD modem 100 encodes both the data signal and the voice signal to provide a combined voice and data signal for transmission, via local loop 101, public switched telephone network (PSTN) 200, and local loop 301, to SVD modem 300. The basic operation of a simultaneous voice and data modem, other than the inventive concept, is described in the above-mentioned Bremer et al. patent application entitled "Simultaneous Analog and Digital Communication," Ser. No. 08/076,505, filed on Jun. 14, 1993, now U.S. Pat. No. 5,448,555, issued Sep. 5, 1995, which is hereby incorporated by reference. SVD modem 300 receives the combined voice and data signal transmitted by SVD modem 100 and provides the data signal to DTE 30, and the voice signal to telephone 40. Transmission of data and voice signals in the opposite direction, i.e., from SVD modem 300 to SVD modem 100, occur in a like fashion. In the description that follows only SVD modem 100 is described, however, it is assumed that SVD modem 300 also incorporates the inventive concept.

As noted earlier, it is sometimes desirable to transmit additional information between the SVD endpoints of FIG. 1, i.e., SVD modem 100 and SVD modem 300. For example, there may be periods of time during voice and data communications between SVD modems 100 and 300 when there is no voice signal present. The presence or absence of a voice signal may not only be important to any SVD autorating technique but also affects the number of data bits per symbol as described in the co-pending, commonly assigned, U.S. patent application of Gordon Bremer, Kenneth D. Ko, and Luke J. Smithwick, entitled "Shaped Signal Spaces in a Simultaneous Voice and Data System," Ser. No. 08/076,530, filed on Jun. 14, 1993. Generally speaking, when transmitting data plus voice the number of symbols in the data signal space is reduced to increase the quality of the voice transmission. The use of a side-channel provides the ability to relay information as to the current data signal space to the far-end SVD modem. This provides the ability to support "voice activated" data rate changes (described below).

Figure 2:
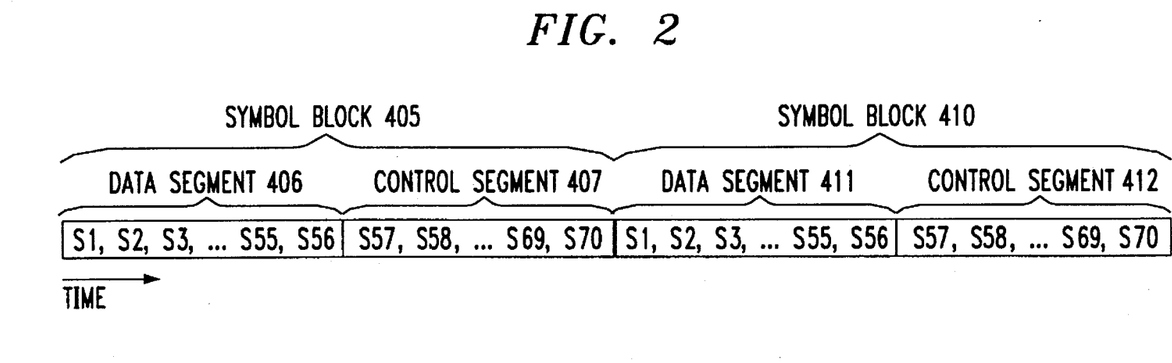
FIG. 2 shows an illustrative symbol block embodying the principles of the invention.

To that end, and in accordance with the inventive concept, FIG. 2 shows a diagram of a transmission scheme that includes a side-channel within an SVD signal. This SVD side-channel not only provides for the transport of additional information between the SVD endpoints of FIG. 1—but also allows the voice signal to be transmitted across the full bandwidth of the SVD data connection.

As can be observed from FIG. 2, information from an SVD modem is provided in a frame, or "symbol block," e.g., symbol block 405. For the purposes of this example, a symbol block comprises 70 symbols. Consecutive symbols within each symbol block are identified as S1, S2, S3, . . . , S70.

Each symbol block is further divided into a data segment, e.g., data segment 406; and a control segment, e.g., control segment 407. Let the group of symbols in the data segment be, for example, S1 to S56. These are the "data symbols" and always convey DTE data. For the purposes of the following discussion the symbol rate is illustratively 3000 symbols/second (s/sec.), although other symbol rates may be used, e.g., 2800 s/sec. At a symbol rate of 3000 s/sec., the average data symbol rate of a symbol block is equal to (56/70)× 3000)=2400 s/sec. Consequently, if there are 6 bits of data per data symbol, the resultant data rate is 14400 bits/sec (bps). It is assumed that this data rate is high enough to meet a user's needs so that the remaining bandwidth of the SVD data connection can be allocated to the control segment, which provides the side-channel.

The remaining symbols of the control segment, i.e., S57 to S70, are the "control symbols." Usually, the latter never convey DTE data, but convey control information. Each control symbol represents a number of "control bits." The control symbols are encoded and scrambled the same as the DTE data symbols, e.g., they use the same signal space. The control symbols provide the side-channel for conveying additional information between SVD modem 100 and SVD modem 300. In accordance with the inventive concept, although the data symbols represent user data and the control symbols represent control information, both the data and control symbols may also convey analog data, which in this example is the voice signal that is provided to SVD modem 100 by telephone 20 (described below). As a result, the side-channel is a part of the simultaneous voice and data transmission.

It should be noted that if a lower symbol rate is used, e.g., 2800 s/sec., the size of the data segment and control segment changes. For example, if it is assumed that both the size of each symbol block is fixed at 70 symbols and that the average symbol rate of 2400 s/sec. should be maintained, then a symbol block at 2800 s/sec. has a data segment of 60 symbols and a control segment of 10 symbols.

Figure 3:
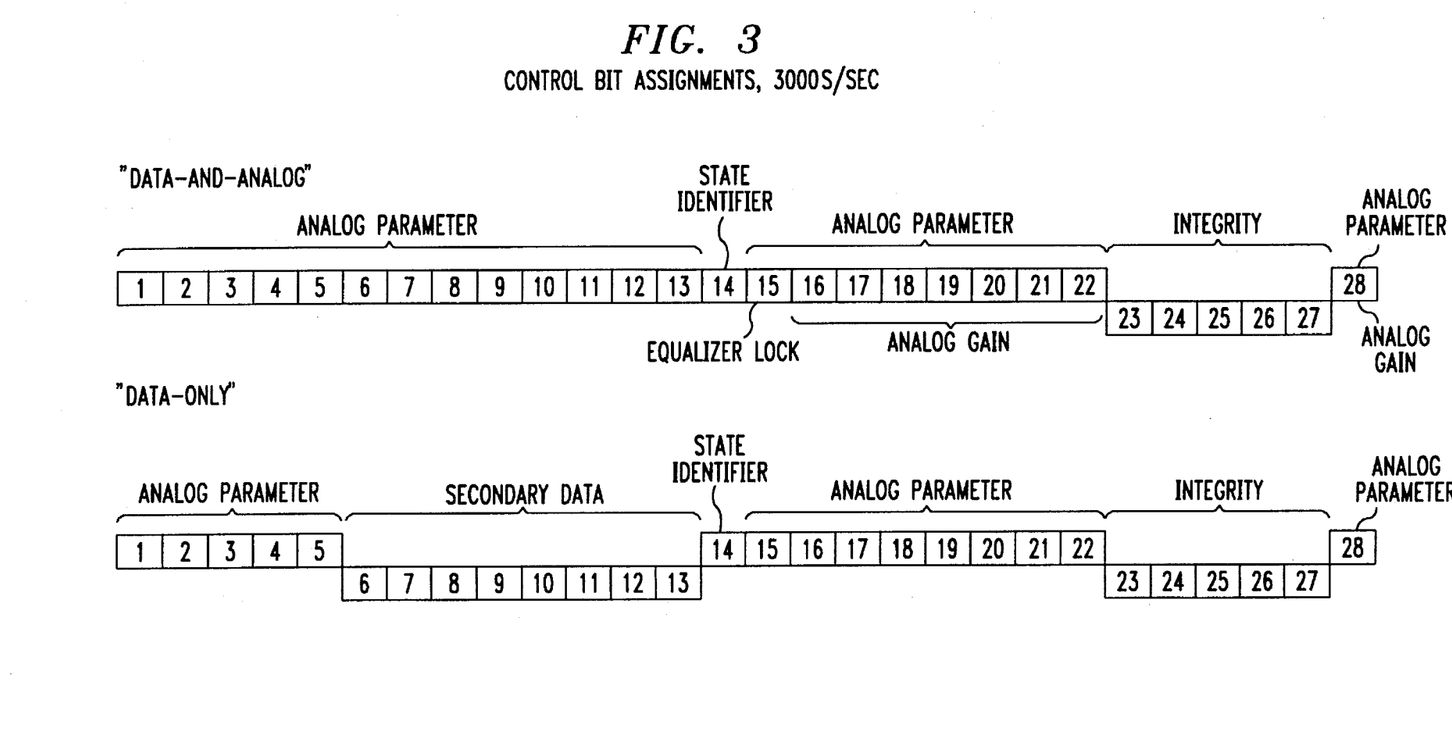
FIG. 3 is an illustration of the control bit assignments for a control segment of a symbol block for both the "data-only" and "data-and-analog" states.
Figure 4A:
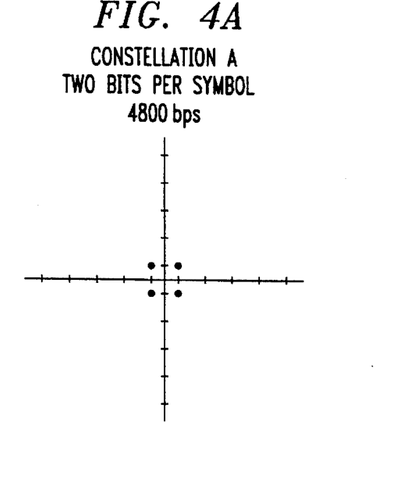
FIGS. 4A–4E show a number of illustrative signal spaces with different bit rates.
Figure 4B:
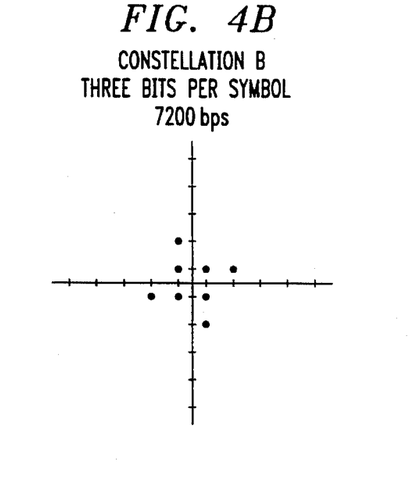
Figure 4C:
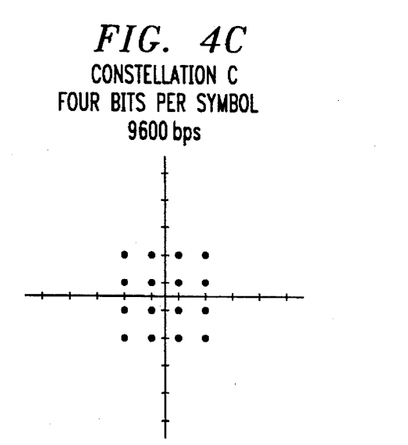
Figure 4D:
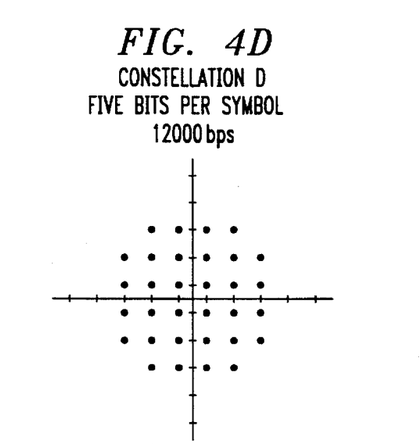
Figure 4E:
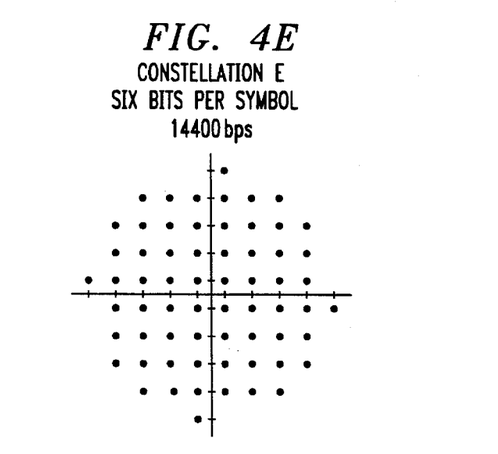

Although the symbols of the control segment can represent any type of information, in this illustrative example the control information is further divided as shown in FIG. 3 to represent analog parameter information, a state identifier, secondary data, and an integrity field. The number of bits available to represent the analog parameter information is a function of both the "state" of the symbol block and the number of bits per control symbol (described below).

The "state" of a symbol block is represented by the value of the "state identifier field" of the previous symbol block. For example, the state of symbol block 410 of FIG. 2 is defined by the value of the state identifier field of symbol block 405, which preceded symbol block 410. The state of any symbol block in this example is limited to two: "data-only" or "data-and-analog." Consequently, the state identifier field is conveniently represented by one bit, illustratively control bit number 14 shown in FIG. 3. A value of "one" represents the "data-and-analog" state, while a value of "zero" represents the "data-only" state.

SVD modem 100 defaults to the "data-only" state, e.g., upon power-up, and the state identifier bit is initially set to represent the "data-only" state in any subsequent data connection established with SVD modem 300. FIGS. 4A–4E show a number of illustrative signal spaces for transmitting information between the SVD modem endpoints. Although the data symbols represent user data and the control symbols represent control information, both the data and control symbols are selected from the same signal space. In the "data-only" state any of these 6 signal spaces can be used to transmit information between the SVD endpoints. Constellation "A" of FIGS. 4A–4E show a signal space where each symbol represents two bits of information. Similarly, constellation "E" illustrates a signal space where each symbol represents 6 bits of information. Preferably, constellation E of FIGS. 4A–4E will be used since, conditions permitting, it allows the highest transmission bit rate between the SVD endpoints.

There is voice transmission between SVD endpoints only in the "data-and-analog" state. As noted above, when simultaneously transmitting both voice and data, there is a tradeoff between the quality of the voice transmission and the size of the symbol constellation. For example, if constellation E of FIGS. 4A–4E is used in the "data-and-analog" state, the higher symbol density reduces the dynamic range of any voice signal that is superimposed on any of the symbols taken from this constellation— with the result that voice quality is impaired. Therefore, it is desirable to select constellation A during voice transmission because the fewer symbols of constellation A allow a larger dynamic range for the voice signal—and therefore improves the quality of the voice signal transmission.

Figure 5:
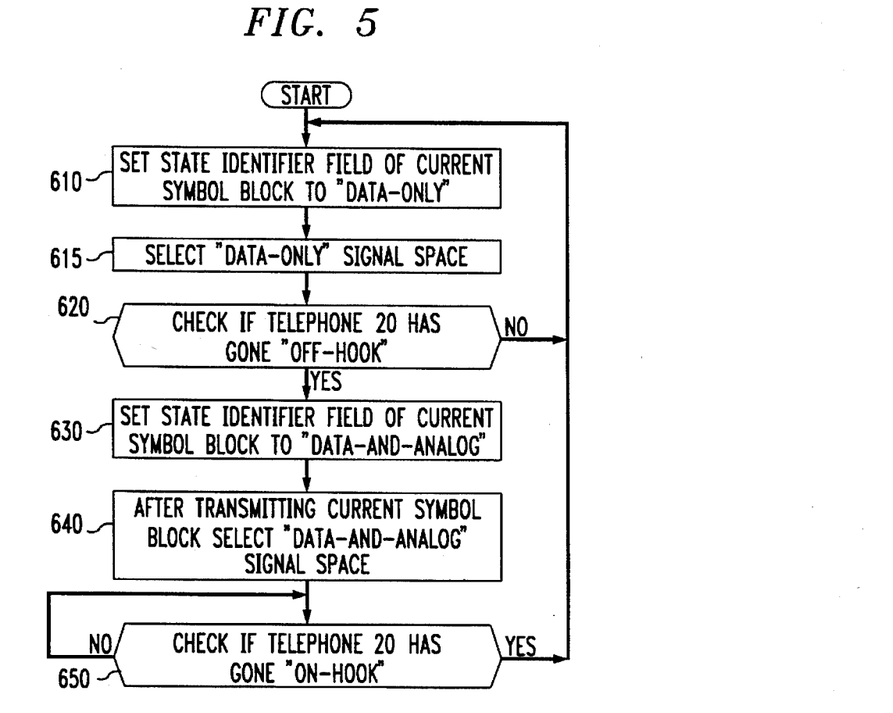
FIG. 5 is an illustrative flow diagram of a "voice activated" data rate change method.

An illustrative method for use in SVD modem 100 for switching between the signal spaces of FIG. 3 is shown in FIG. 5. At power-up, or the beginning of each data connection, SVD modem 100 enters the "data-only" state in step 610. In step 615, SVD modem 100 selects that signal space associated with the "data-only" state, i.e., the highest data rate negotiated between SVD modem 100 and SVD modem 300. SVD modem 100 monitors telephone 20 in step 620 to check if telephone 20 has gone "off-hook." As long as user 1 does not go off-hook, SVD modem 100 remains in the "data-only" state by returning to step 610. However, when SVD modem 100 detects that user 1 has taken telephone 20 off-hook, SVD modem 100 assumes that voice communications is desired and switches to the "data-and-analog" state. In step 630, SVD modem 100 alters the state identifier bit in the current symbol block, e.g., block 405 of FIG. 2, to indicate to SVD modem 300 that the next symbol block, e.g., block 410, will be in the "data-and-analog" state. Upon completion of transmitting symbol block 405, SVD modem 100 then switches to constellation A of FIGS. 4A–4E in step 640 for the transmission of symbol block 410. Thus, when user 1 goes off-hook at telephone 20, SVD modem 100 dynamically changes the bit rate to accommodate the presence of a voice signal. Consequently, upon reception of block 405, SVD modem 300 not only knows which signal space to use to decode the incoming symbol stream from block 410, but also can infer the state of the switch hook at telephone 20.

After switching to the "data-and-analog" state, SVD modem 100 monitors telephone 20 to detect that user 1 has gone "on-hook" in step 650. When user 1 goes "on-hook," SVD modem 100 returns to step 610 to set the state identifier field for the next symbol block to the "data-only" state and thereafter switches data rates back to the last data rate negotiated between SVD modem 100 and SVD modem 300.

Returning to FIG. 3, the number of control bits in the control segment is shown as fixed at 28 bits. However, generally speaking, assuming a constant symbol rate, the number of control bits available for the control segment varies with the number of bits per control symbol. For example, in the "data-only" state any of the constellations of FIG. 4 may be used. If constellation E is used, there are 6 bits per symbol. Therefore, there are 84 bits available in any control segment for transporting control information between SVD modem 100 and SVD modem 300. However, in the "data-and-analog" state, SVD modem 100 switches to constellation A, which results in only 2 bits per symbol, or 28 bits in the control segment for the 14 control symbols S57 to S70. Consequently, while the number of bits in a control segment could indeed vary as a function of the selected signal space, in this embodiment, the number of bits in the control segment is bounded by the number of control bits available in the "data-and-analog" state, i.e., 28 bits.

In the "data-and-analog" state, control bits N1 to N13, N15 to N22, and N28, are used to represent "analog parameter" information. Similar to the state indicator field, these analog parameters convey information pertaining to the next symbol block like "adaptive gain" information in bit locations 15–22, and 28. In this example, the analog parameter bit locations 1–13 in the "data-and-analog" mode are reserved for future use. It should be noted that information conveyed by the control segment does not have to be restricted to information about the "next" symbol block.

In a "data-only" symbol block, the transmission of "analog parameters" is optional. In fact, the number of control bits available for the transport of analog parameter information is reduced so that in the "data-only" state secondary data is transmitted by control bits N6 to N13. Any transmission of secondary data does not use all of the control bit assignments even though there is no "analog parameter" information transmitted in a "data-only" state. Using these control bit assignments, the secondary data rates at 3000 s/sec. is 342 bits per sec.

As noted above, in the "data-only" state higher density signal spaces may be used with the result that there are more bits available for transport of control information than are actually used in the above-defined control segment. However, there is nevertheless a way to use these additional data bits in the SVD communications system of FIG.. 1 to minimize errors in detecting the correct state of a received SVD symbol block.

If an SVD receiver makes an error in detecting the correct state of the received symbol block, this error has different effects on a user depending on the correct state. For example, if the state of a received symbol block is "data-only" but the receiver interprets the state as "data-and-analog," then the receiver will decode data with perhaps the wrong decision regions and will enable the analog output—causing a "data blast" to the listener. Conversely, if the state is "data-and-analog" but the receiver interprets the state as "data-only" then the receiver will inadvertently silence the analog output. Of these two possible error conditions, it is likely that an erroneous decision that the symbol block is in the "data-only" state is more acceptable to a user since the user will only hear silence. However, a mistaken decision that the symbol block is in the "data-and-analog" state may be more annoying to a user because of the likelihood a user will hear a data blast. Therefore, it would be better if the possibility of this latter type of error were minimized. Especially since the possibility of this type of error increases as the data rate increases.

Figure 6:
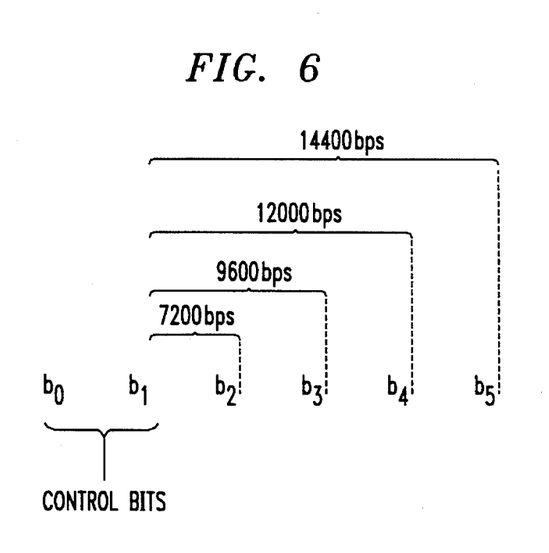
FIG. 6 is an illustration of the availability of redundant bits for the control segment at data rates higher than 4800 bps.

To lessen the possibility of an erroneous detection of the "data-and-analog" state while in the "data-only" state, some of the additional bits heretofore unused in each control symbol, at data rates higher than 4800 bps, are now utilized as "redundant" state identifier bits. In particular, one additional bit per control symbol is used at data rates greater than 4800 bps. This provides an additional fourteen bits of information, albeit redundant, to an SVD receiver. FIG. 6 shows a simple illustration of this technique. While in the "data-only" state, data transmission can occur at data rates from 4800 bps to 14400 bps as provided by the signal spaces shown in FIGS. 4A–4E. Each control symbol therefore represents a number of bits that is a function of the currently selected signal space. This number of bits varies from $b_0$ to $b_5$ as shown in FIG. 6. The data rate of 4800 bps provides the minimum number of bits per symbol—$b_0$ and $b_1$. As the data rate increases, additional bits become available, e.g., one bit, $b_2$, at a data rate of 7200 bps, and upto four bits, $b_2$ to $b_5$, at a data rate of 1400 bps. In this illustrative embodiment, only one additional bit, e.g., $b_2$, is used; any additional bit capacity at the higher data rates is simply ignored.

These fourteen bits are simply copies of the state identifier bit transmitted in the control segment of the current symbol block. The SVD receiver performs a "majority" vote of the fourteen redundant bits and the state identifier bit from the control segment to determine the appropriate state for the next symbol block.

Although at data rates higher than 4800 bps an additional redundant bit is used from the control symbols to protect against an erroneous decision by an SVD receiver as to the state of the next symbol block, at the lower data rate of 4800 bps it is assumed that the integrity field of the control segment, combined with the spatial separation provided in the 4800 bps constellation, provides adequate protection of the state identifier bit.

From FIG. 3, it can be seen that five control bits define the integrity field. In this example, the integrity field represents the inverse of five other predefined control bits. These integrity bits are used to bolster the decoding of the control segment by an SVD receiver. The five control bits 14 through 18 are protected by the integrity field. These are the state identifier bit, the equalizer lock bit for the upcoming symbol block, and 3 bits that represent the most significant bits of adaptive gain. The SVD receiver uses biased voting to evaluate the integrity bits. For example, if received adaptive gain bit is inconsistent with its respective integrity bit, the receiver uses the gain value that results in a lower volume to the audio speaker, on the premise that a brief reduction in volume is more acceptable to the listener than an unexpected increase in volume.

As shown in FIG. 3, the integrity field is located within the control segment, as opposed to being located at either boundary of the control segment, to increase the probability that a shift in timing will cause errors in the integrity field. An SVD receiver also keeps track of integrity errors over multiple symbol blocks as an indicator of gross channel conditions or loss of symbol counter synchronization (described below). Either of these conditions causes the SVD receiver to perform a retraining with the opposite SVD endpoint.

As described above, it is advantageous to protect against the possible occurrence of an erroneous switch from one state to the other. In the analog parameter field there is gain information for the voice signal in the "data-and-analog" state. However, it is not necessary to provide any gain information in the "data-only" state since there is no voice signal. Therefore, additional protection can be provided against an erroneous switch from the "data-only" state to the "data-and-analog" state by providing dummy gain information such that if an SVD receiver erroneously switches to the "data-and-analog" state the resulting amplification of the data signal, which appears as noise to a user, is low.

Figure 7:
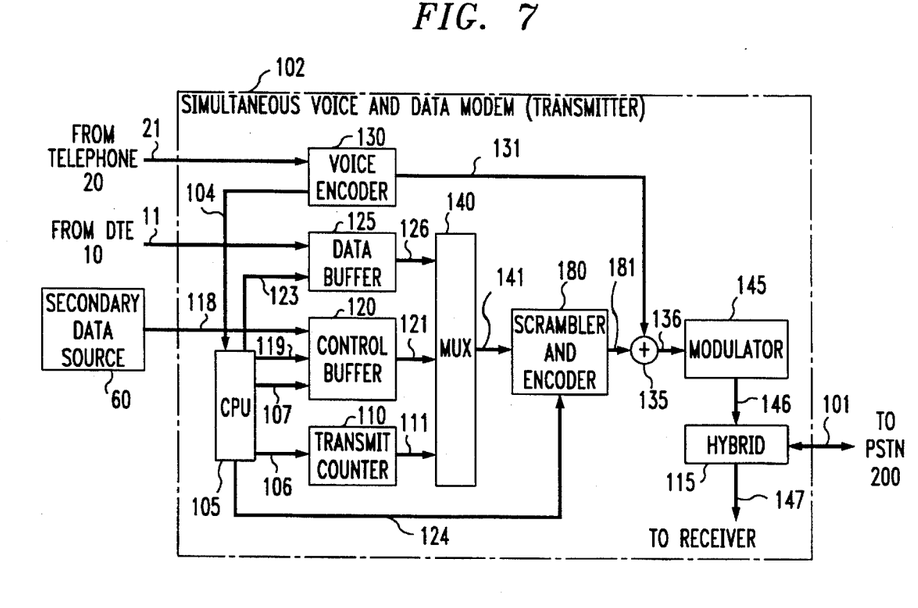
FIG. 7 shows a block diagram of the transmitter portion of a simultaneous voice and data modem embodying the principles of the invention.

Reference should now be made to FIG. 7, which shows a block diagram of transmitter 102 of SVD modem 100 that embodies the principles of this invention. Other than the inventive concept, the individual components of SVD modem 100 are well-known and are not described in detail. For example, CPU 105 is a microprocessor-based central processing unit and associated memory for storing program data. Also, it is assumed that the operating data symbol rate and the number of data bits per symbol in the "data-only" state are determined during the initial training and rate negotiation sequences, and by any retraining sequences that occur between SVD modems 100 and 300. Although it is assumed that the symbol rate does not change during a communications session, the number of data bits per symbol may also change in accordance with any of the well-known autorating techniques.

Telephone 20 provides a voice signal to voice encoder 130. The latter provides a sequence of two-dimensional signal points, at a predefined symbol rate of 1/T symbols per sec., on line 131. Each two-dimensional signal point represents a "voice signal vector" about the origin of a signal space (not shown). In addition, line 104 conveys signaling to provide CPU 105 with information on the "off-hook" status of telephone 20, and analog gain information for transmission to far-end SVD modem 300. As discussed above, the "off-hook" signal alerts CPU 105 when user 1 at telephone 20 goes off-hook or on-hook so that SVD modem 100 can select between the "data-only" state or the "data-and-analog" state as described above. CPU 105 controls the selection of the appropriate signal space in scrambler and encoder 180 via the signal on line 124.

DTE 10 provides a data signal to data buffer 125, which stores the data provided by DTE 10 for latter delivery to multiplexer (MUX) 140. Control buffer 120 receives two signals on lines 107 and 118. The signal on line 118 represents any secondary data source. In fact, secondary data source 60 represents the ability of SVD modem 100 to provide additional bandwidth for data communications albeit within the control segment during the "data-only" mode of operation. Although shown for simplicity as an independent source, secondary data source 60 can be DTE 10. For example, control buffer 120 could be coupled to data buffer 125 to allocate this additional data bandwidth to DTE 10. In comparison, the signal on line 107 represents the analog parameter information as defined in FIG. 3. It can be observed that while this embodiment sends a variety of different types of control information, there is no requirement that any information peculiar to the SVD communications system be transmitted in the control segment.

The state of SVD modem 100 is provided from CPU 105 to control buffer 120 via line 119. This represents the value used by control buffer 120 for the state indicator bit of the control segment. If SVD modem 100 is in the "data-only" state, then control buffer 120 multiplexes any analog parameter information, if any, along with the secondary data to provide the control segment as shown in FIG. 3 for the "data-only" state. On the other hand, if SVD modem 100 is in the "data-and-analog" state, then control encoder 120 provides the "data-and-analog" control segment, which only includes analog parameter information as provided by CPU 105 via line 107. Control encoder 120 also generates the integrity field and, for signal spaces which accommodate it, duplicates the state identifier bit to provide the above-described redundancy when the data rate is greater than 4800 bps.

Transmit counter 110 controls MUX 140, which provides either data or control information to scrambler and encoder 180. The latter includes any of the well-known encoding techniques like scrambling, trellis-coding, etc., to provide the sequence of symbols on line 181 at a symbol rate, 1/T. The symbols are selected from one of the signal spaces shown in FIGS. 4A–4E. The selection of the signal space is controlled by CPU 105 via line 124.

CPU 105 synchronizes transmit counter 110 in response to a training, or retraining, event between SVD modems 100 and 300. As is known in the art, both modems of a data connection typically perform a hand-shaking procedure that includes a training sequence to initialize the equalizers and echo cancelers of each modem (not shown). The need to perform a retraining sequence is detected by the loss of synchronization. Loss of synchronization is detected be CPU 110 when the receiver of SVD modem 100 (discussed below) indicates that too many integrity field errors have occurred over a number of received symbol blocks.

Transmit counter 110 must be synchronized because transmit counter 110 frames the symbol blocks by counting symbol periods. As described above, and shown in FIG. 2, each symbol block includes 70 symbols. Therefore, transmit counter 110 counts "modulo 70." During the first 56 symbol periods, i.e., the data segment, transmit counter 110 controls MUX 140 to provide the data segment information to scrambler and encoder 180. During the last 14 symbol periods, i.e., the control segment, transmit counter 110 controls MUX 140 to provide the control segment information to scrambler and encoder 180.

Adder 135 adds each voice signal vector on line 131, if any, to a respective one of the symbols provided by scrambler and encoder 180 to provide a stream of signal points to modulator 145. The latter functions in accordance with the well-known quadrature amplitude modulation (QAM) to provide a transmit signal to hybrid 146 for transmission to SVD modem 300 via PSTN 200.

Receiver 103 of SVD modem 100 performs complementary functions to transmitter 102 described above and is shown in block diagram form in FIG. 8. Common elements in receiver 103 and transmitter 102 have the same reference numeral, e.g., CPU 105, hybrid 115, etc. Hybrid 115 receives a transmitted signal from SVD modem 300, via PSTN 200, and applies this received signal to demodulator 150. The latter provides a received signal point sequence to decoder 190, which performs the inverse function of scrambler and encoder 180 of transmitter 102 to provide an information-bearing signal each symbol period to demultiplexer (DEMUX) 155. Receive counter 175 controls DEMUX 155 via line 177. After a training, or retraining, event, as described above, CPU 105 resets receive counter 175 to begin counting modulo 70. Receive counter 175 controls DEMUX 155 to apply the first 56 symbol periods of information to DTE 10 via line 11. This is the data segment. Then receive counter 175 controls DEMUX 155 to apply the last 14 symbol periods of information to control element 165. Receive counter 175 repetitively continues this demultiplexing of the received information stream until reset by CPU 105.

Figure 8:
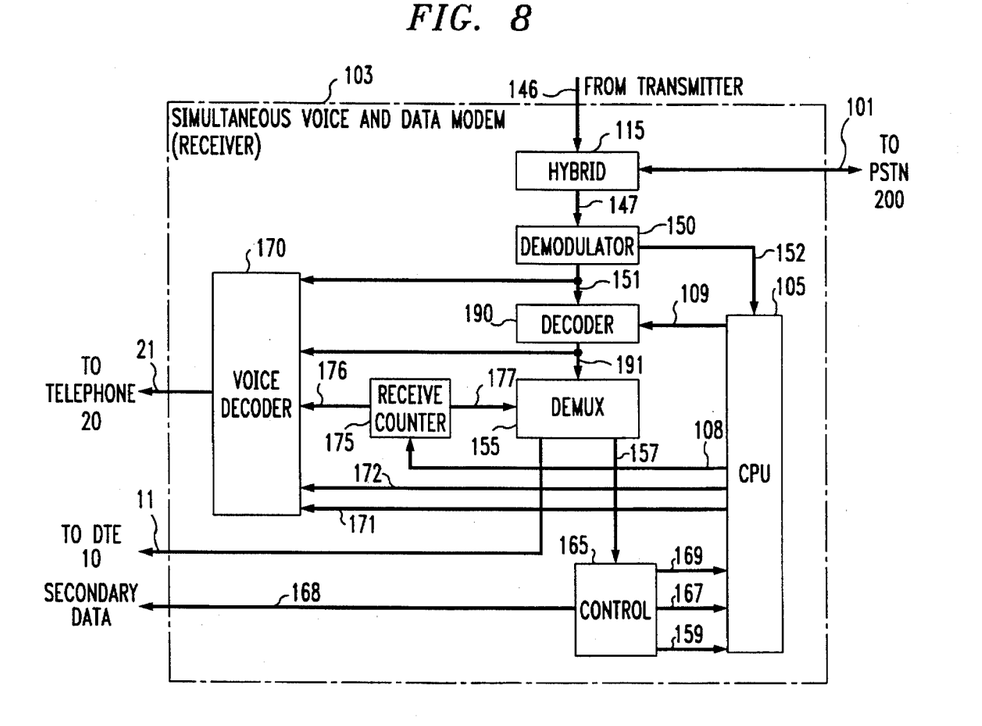
FIG. 8 shows a block diagram of the receiver portion of a simultaneous voice and data modem embodying the principles of the invention.

As noted above, each SVD modem initially begins in the "data-only" state. Consequently, receiver 103 assumes that the first symbol block received is in the "data-only" state. The state indicator field of this first symbol block then determines the state of the succeeding symbol block, etc.

Control element 165 provides CPU 105 with the value of the state indicator bit on line 167; any analog parameter information on line 169; and an indicator if there was an error in the integrity field on line 159. Control decoder 165 performs the majority vote for any duplicate state indicator bits (as described above) when the data rate is greater than 4800 bps. Additionally, control decoder 165 processes the integrity field bits (as described above). Finally, control decoder 165 provides any secondary data, via line 168.

In response to the information provided by control decoder 165, CPU 105 performs a number of actions. First, based on the value of the state indicator information, CPU 105 controls the signal space used by decoder 190 to decode the next symbol block via line 109. This allows receiver 103 to correctly demultiplex and decode the received signal point sequence. Next, CPU 105 adjusts any analog settings based upon the analog parameter information, via line 172. In this embodiment, the analog parameter information is only used by voice decoder 170. This allows receiver 103 to easily adapt gain settings for the voice signal and other analog parameters (if any). Finally, CPU 105 generates a retrain based upon the cumulative statistics of the number of errors in the integrity field over a period of time. When a retrain event occurs, CPU 105 resets receive counter 175. It should be noted that CPU 105 also resets the receive counter if a training, or retraining, sequence from the far-end SVD modem is detected by demodulator 150, which notifies CPU 105 via line 152.

Voice decoder 170 provides the voice signal during the "data-and-analog" state to telephone 20. Voice decoder 170 is enabled during the "data-and-analog" state by CPU 105 via line 171. Receive counter 176 provides a synchronization signal to voice decoder 170 so that the correct received symbol is subtracted from the received signal point sequence conveyed by line 151. The received symbol sequence is provided by line 191 of decoder 190. Voice decoder 170 includes buffering to accommodate any delays introduced by decoder 190 in decoding the received signal points.

Figure 9:
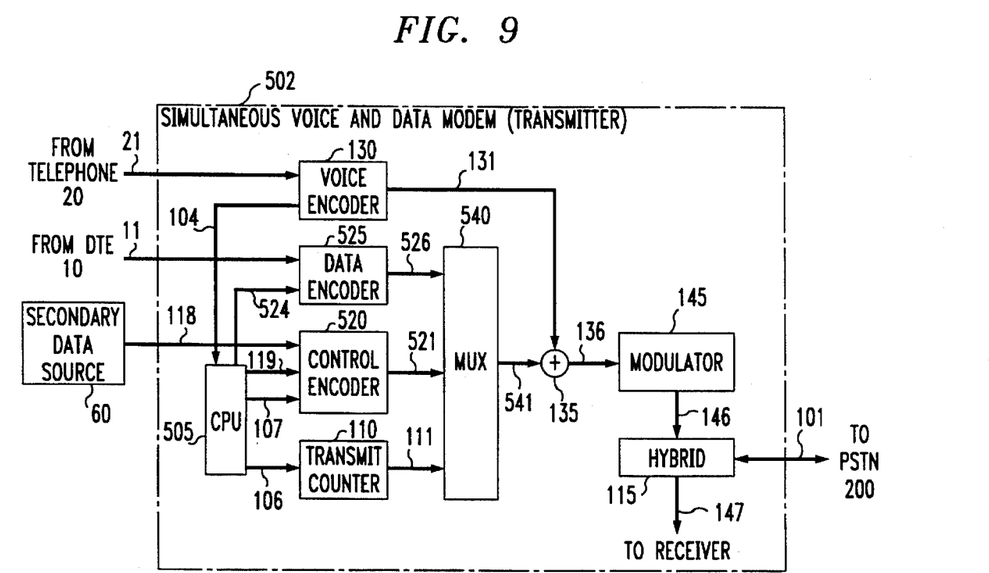
FIG. 9 shows a block diagram of another embodiment of the transmitter portion of a simultaneous voice and data modem embodying the principles of the invention.

The above-described inventive concept thus creates an SVD side-channel, where both the data and control symbols are available to carry the voice signal. Another embodiment of the inventive concept in shown in FIGS. 9 and 10. FIG. 9 is a block diagram of the transmitter portion of an SVD modem and is similar to FIG. 7 except that the respective signal spaces used for the data and control segments are different.

DTE 10 provides a data signal to data encoder 525, which provides a sequence of two-dimensional signal points at the symbol rate, 1/T. These two-dimensional signal points are selected from one of the signal spaces shown in FIGS. 4A–4E, which is controlled by CPU 105 via line 524. Each signal point is associated with a particular two-dimensional data symbol. Data encoder 525 includes any of the well-known encoding techniques like scrambling, trellis-coding, etc., to provide the sequence of data symbols.

Control encoder 520 receives two signals, as described above, on lines 107 and 119 and provides a sequence of control symbols on line 521 at the symbol rate, 1T. Control encoder 520 functions in a similar fashion to data encoder 525 and includes any of the well-known encoding techniques like scrambling, trellis-coding, etc., to provide the sequence of control symbols. Similar to data encoder 525 above, these two-dimensional symbols are selected from one of the signal spaces shown in FIG. 4. These control symbols represent a control segment. The state of SVD modem 100 is provided from CPU 105 via line 119. If SVD modem 100 is in the "data-only" state, then control encoder 520 multiplexes any analog parameter information, if any, along with the secondary data to provide the control segment as shown in FIG. 3 for the "data-only" state. On the other hand, if SVD modem 100 is in the "data-and-analog" state, then control encoder 520 provides the "data-and-analog" control segment, which only includes analog parameter information as provided by CPU 105 via line 107. Control encoder 520 also generates the integrity field and, in the "data-only" state, duplicates the state identifier bit to provide the above-described redundancy when the data rate is greater than 4800 bps.

Transmit counter 110, which counts modulo 70, controls multiplexer (MUX) 540, which provides the above mentioned symbol blocks on line 541. CPU 105 synchronizes transmit counter 110 in response to a training, or retraining, event between SVD modems 100 and 300. During the first 56 symbol periods, i.e., the data segment, transmit counter 110 controls MUX 540 to provide the data symbols from data encoder 525 to adder 135. During the last 14 symbol periods, i.e., the control segment, transmit counter 110 controls MUX 540 to provide the control symbols from control encoder 520 to adder 135. Since transmit counter 110 switches MUX 540 between data encoder 525 and control encoder 520, each of these encoders must include buffers to provide storage for any data accumulated during that period of time when the other encoder is providing symbols to MUX 540.

Adder 135 adds each voice signal vector on line 131, if any, to a respective one of the symbols provided by MUX 540 to provide a stream of signal points to modulator 145. The latter functions in accordance with the well-known quadrature amplitude modulation (QAM) to provide a transmit signal to hybrid 146 for transmission to SVD modem 300 via PSTN 200.

Figure 10:
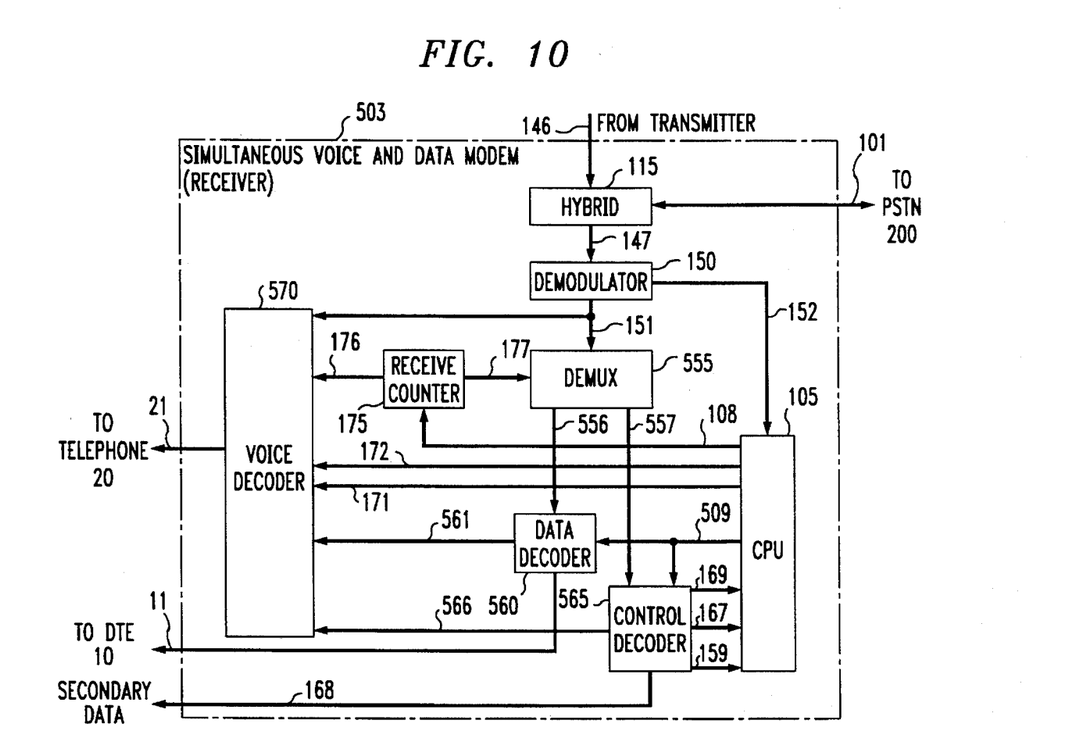
FIG. 10 shows a block diagram of another embodiment of the receiver portion of a simultaneous voice and data modem embodying the principles of the invention.

Receiver 503, shown in FIG. 10, performs complementary functions to transmitter 502 of FIG. 9. Hybrid 115 receives a transmitted signal from SVD modem 300, via PSTN 200, and applies this received signal to demodulator 150. The latter provides a received signal point sequence to demultiplexer (DEMUX) 555, which is controlled by receive counter 175 via line 177. After a training, or retraining, event, as described above, CPU 105 resets receive counter 175 to begin counting modulo 70. Receive counter 175 controls DEMUX 555 to apply the first 56 received signal points to data decoder 560. Then receive counter 175 controls DEMUX 555 to apply the last 14 received signal points of the received symbol block to control decoder 565. Receive counter 175 repetitively continues this demultiplexing of the received signal point stream until reset by CPU 105.

Control decoder 565 provides CPU 105 with the value of the state indicator bit on line 167; any analog parameter information on line 169; and an indicator if there was an error in the integrity field on line 159. Control decoder 565 performs the majority vote for any duplicate state indicator bits (as described above) when the data rate is greater than 4800 bps. Additionally, control decoder 565 processes the integrity field bits (as described above). Finally, control decoder 565 provides any secondary data, via line 168.

In response to the information provided by control decoder 565, CPU 105 performs a number of actions. First, based on the value of the state indicator information, CPU 105 controls the signal space used by data decoder 560 and control decoder 565 to decode the next symbol block via line 109. This allows receiver 503 to correctly demultiplex and decode the received signal point sequence. Next, CPU 105 adjusts any analog settings based upon the analog parameter information, via line 172. Finally, CPU 105 resets receive counter 175 in response to a training, or retraining, event as described earlier.

Both data decoder 560 and control decoder 565 perform the inverse of the coding functions of data encoder 525 and control encoder 520, respectively. Voice decoder 570 provides the voice signal during the "data-and-analog" state to telephone 20. Voice decoder 570 is enabled during the "data-and-analog" state by CPU 105 via line 171. Receive counter 176 provides a synchronization signal to voice decoder 570 so that the correct received symbol is subtracted from the received signal point sequence conveyed by line 151. Voice decoder 570 includes buffering to accommodate any delays introduced by data decoder 160 and control decoder 165 in decoding the received symbols.

An SVD symbol block conveys either synchronous data, or asynchronous data, streams. However, the use of an SVD symbol block makes it possible to send "raw" asynchronous data (defined below) without sending the start and stop bits of this data. The start and stop bits are removed after a character is received from the DTE and restored at the other end of the circuit before sending the character to the DTE. The framing provided by the SVD block coding is used to preserve the character boundaries so that they can be properly reconstructed at the receiving end of the link. The ability to send asynchronous formatted data without the start and stop bits provides a significant improvement in the overall responsiveness of the system and effectively increases the available data bandwidth by 25%.

The term "raw" asynchronous data means that the modem is configured so that the modem's own error control and data compression capabilities are not used. In this mode, commonly referred to as "buffered mode," characters received from the DTE are sent bit for bit to the other modem. Because flow control mechanisms are still available, the data rate between the DTE and the modem can be different from the rate used over the PSTN line, however the data content of the two data streams are identical.

In this embodiment, this raw data mode is enabled by CPU 105 in response to DTE 10 providing a "buffered mode" command. As in known in the art, data terminal equipment, like DTE 10, can configure or control various options in a modem, like SVD modem 100, by putting the modem in a "command mode." During the command mode of operation, the modem interprets data from the data terminal equipment as instructions for the modem. A user of a modem may enter the command mode in a number of ways, e.g., by applying power to the modem, or by sending to the modem a predefined sequence of characters, like "+++" as defined in the "AT command set." For the purposes of this discussion, SVD modem 100 provides a command mode that is similar to the "AT command set."

Referring back to FIG. 7, after receiving the buffered modem command, CPU 105 of SVD modem 100 provides not only the current state identifier to data buffer 125, but also uses line 123 to provide a signal to data buffer 125 to strip the start and stop bits from any data provided by DTE 10. One bit from the analog parameter field is then used to identify this raw data mode to specify that the next data segment includes raw data. As a result, receiving SVD modem 300, upon detecting this information in the analog parameter field, then controls DEMUX 155 to reconstruct the data bytes by adding the start and stop bits before sending the data to DTE 10.

This data transfer configuration may be performed for use by "telegraphics" programs which are PC applications that are designed for efficient transfer of graphical information over PSTN circuits. These programs must communicate with the modem using asynchronous data formats because personal computers are not equipped with the interfacing hardware needed for more bandwidth-efficient synchronous transmission.

For an SVD symbol block in which the number of data symbols is an integral number of eight, no additional framing information is needed since, regardless of the number of data bits per symbol, each block contains an integral number of octets derived from asynchronous characters by stripping the start and stop bits. However, for an SVD symbol block in which the number of symbols is not an integral multiple of eight, a "super-frame" structure is required. This requires reserving at least one bit of the available "analog parameter bits" (or some unique pattern of these bits) to periodically mark the beginning of the super-frame.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., encoders, decoders, transmitter, etc., the functions of any one or more of those building blocks can be carried out using one or more appropriate programmed processors, e.g., a digital signal processor.

In addition, the analog signal is not limited to a voice signal, any analog signal can be used, e.g., even another data-bearing signal. The order of the control and data segments does not matter, and the inventive concept is applicable to any N-dimensional signal space. Other techniques can be used to select the appropriate signal space as a function of the state of an SVD modem, e.g., detecting the presence of voice energy from the telephone. Also, the integrity field is not limited to an inverse bit technique, other error detection schemes, like parity, can be performed on a portion, or all, of the control segment. Finally, while FIG. 1 illustratively coupled simultaneous voice and data modem 100 to DTE 10 and telephone 20 via local loop 101, the inventive concept is also applicable to other communications environments like cellular.

We claim:

1. A method for transmitting a side-channel in a simultaneous analog and digital communications system, the method comprising the steps of:

multiplexing a plurality of symbol streams to provide a sequence of symbol blocks, where each symbol block includes a predefined number of symbols from each symbol stream; and transmitting each symbol block;

wherein the step of transmitting further includes the step of adding to each symbol of each symbol block a signal point before transmission.

2. The method of claim 1 further including the step of encoding an analog signal to provide the signal point.

3. The method of claim 2 wherein the analog signal is a voice signal.

4. The method of claim 1 wherein the plurality of symbol streams is a data symbol stream and a control symbol stream and each symbol block includes a data segment and a control segment, wherein the data symbols of each symbol block are contiguously located within the data segment and the control symbols of each symbol block are contiguously located within the control segment.

5. The method of claim 4 wherein the control segment represents a fixed number of bits, Y, which is equal to the number of control symbols within a symbol block multiplied by a y number of bits from each of these control symbols.

6. The method of claim 5 wherein each control symbol represents x bits, and x>y.

7. The method of claim 6 wherein duplicate control information is conveyed by x-y bits of each control symbol.

8. The method of claim 4 wherein the data symbols represent a synchronous data stream.

9. The method of claim 4 wherein the data symbols represent an asynchronous data stream without the start and stop bits.

10. The method of claim 4 wherein at least a portion of the control information conveyed by a current control segment is a function of the information conveyed by a succeeding symbol block.

11. A method for transmitting side information in a simultaneous analog and data communications system, the method comprising the steps of:

encoding a data signal to provide a number of data symbols, J, over a period of time equal to $T_1$;

encoding at least one control signal to provide a number of control symbols, K, over a period of time equal to $T_2$, where the control signal represents control information;

multiplexing the number of data symbols and the number of control symbols to provide a symbol block comprising the J+K symbols;

encoding an analog signal to provide a number of signal points over the time period $T_1+T_2$;

adding each one of the signal points to a respective symbol of the symbol block to provide a number of resultant signal points; and transmitting the number of resultant signal points.

12. The method of claim 11 wherein the symbol block has a data segment and a control segment, wherein the J data symbols are contiguously located within the data segment and the K control symbols are contiguously located within the control segment.

13. The method of claim 11 wherein the data symbols and the control symbols are selected from the same signal space.

14. The method of claim 11 wherein the control information conveyed by a current symbol block is a function of a succeeding symbol block.

15. The method of claim 14 wherein the control information represents adaptive gain information for the succeeding block.

16. The method of claim 14 wherein the control information conveys data rate information for a succeeding symbol block.

17. The method of claim 12 wherein the control segment represents a fixed number of bits, Y, which is equal to the K control symbols within a symbol block multiplied by a y number of bits from each of these control symbols.

18. The method of claim 17 wherein each control symbol represents x bits, and x>y.

19. The method of claim 18 wherein duplicate control information is conveyed by x-y bits of each control symbol.

20. The method of claim 11 wherein the data symbols represent a synchronous data stream.

21. The method of claim 11 wherein the data signal represents an asynchronous character stream, each asynchronous character having a start and a stop bit.

22. The method of claim 21 wherein the data encoding step removes the start and stop bit from each asynchronous character.

23. A method for use in a modem comprising the steps of:

demultiplexing a stream of received signal points from a far-end modem to provide a plurality of signal point streams;

decoding each one of the plurality of signal points streams to provide a respective plurality of symbol streams; and decoding each one of the received signal points as a function of the plurality of symbol streams to provide an analog signal.

24. The method of claim 23 wherein the analog signal is a voice signal.

25. The method of claim 23 wherein the step of decoding each one of the plurality of signal points streams further includes the steps of:

providing a data signal from one of the plurality of signal point streams; and providing a control signal :from a different one of the plurality of signal point streams.

26. The method of claim 25 further including the step of adjusting the analog signal as a function of information conveyed by the control signal.

27. Apparatus for transmitting a side-channel in a simultaneous analog and digital communications system, the apparatus comprising:

means for multiplexing a plurality of symbol streams to provide a sequence of symbol blocks, where each symbol block includes a predefined number of symbols from each symbol stream; and means for transmitting each symbol block;

wherein the means for transmitting further includes a means for adding to each symbol of each symbol block a signal point before transmission.

28. The apparatus of claim 27 further including a means for encoding an analog signal to provide the signal point.

29. The apparatus of claim 27 wherein the analog signal is a voice signal.

30. The apparatus of claim 27 wherein the plurality of symbol streams is a data symbol stream and a control symbol stream and each symbol block includes a data segment and a control segment, wherein the data symbols of each symbol block are contiguously located within the data segment and the control symbols of each symbol block are contiguously located within the control segment.

31. The apparatus of claim 30 wherein the control segment represents a fixed number of bits, Y, which is equal to the number of control symbols within a symbol block multiplied by a y number of bits from each of these control symbols.

32. The apparatus of claim 31 wherein each control symbol represents x bits, and x>y.

33. The apparatus of claim 32 wherein duplicate control information is conveyed by x-y bits of each control symbol.

34. The apparatus of claim 30 wherein the data symbols represent a synchronous data stream.

35. The apparatus of claim 30 wherein the data symbols represent an asynchronous data stream without the start and stop bits.

36. Modem apparatus comprising:

means responsive to a data signal for providing a stream of data symbols, each data symbol selected from a first signal space;

means responsive to at least one control signal for providing a stream of control symbols, each control symbol selected from a second signal space;

means for developing a number of symbol blocks, each symbol block comprising a number of the data symbols and a number of the control symbols;

means responsive to an analog signal for providing a stream of signal points;

means for adding each one of the signal points to at least some of the symbols of each symbol block to provide an stream of resultant signal points; and means for transmitting the resultant signal point stream.

37. The apparatus of claim 36 wherein the analog signal is a voice signal.

38. The apparatus of claim 36 wherein the means for developing includes a counting means for counting each dam symbol and control symbol in each symbol block.

39. The apparatus of claim 36 wherein the means for transmitting is a quadrature amplitude modulator.

40. The apparatus of claim 36 wherein each symbol block includes a data segment and a control segment, wherein the number of data symbols are contiguously located within the data segment and the number of control symbols are contiguously located within the control segment.

41. The apparatus of claim 40 wherein at least one of the control symbols represents information about a succeeding symbol block.

42. The apparatus of claim 40 wherein the control symbols represent secondary data.

43. The apparatus of claim 40 wherein the data symbols represent a synchronous data stream.

44. The apparatus of claim 40 wherein the data signal represents an asynchronous character stream, each asynchronous character having a start and a stop bit and wherein the means responsive to a data signal removes the start and stop bit from each asynchronous character.

45. A modem apparatus comprising:

means for demultiplexing a stream of received signal points from a far-end modem to provide a plurality of signal point streams;

means for decoding each one of the plurality of signal points streams to provide a respective plurality of symbol streams; and means for decoding each one of the received signal points as a function of the plurality of symbol streams to provide an analog signal.

46. The apparatus of claim 45 wherein the analog signal is a voice signal.

47. The apparatus of claim 45 wherein the means for decoding each one of the plurality of signal points streams further includes:

means for providing a data signal from one of the plurality of signal point streams; and means for providing a control signal from a different one of the plurality of signal point streams.

48. The apparatus of claim 47 further including a processing means that is responsive to the control signal for adjusting a parameter of the means for decoding that provides the analog signal.

49. The apparatus of claim 47 wherein the data signal represents a sequence of asynchronous characters and the means for providing a data signal adds a start bit and a stop bit to each character in forming the data signal.

50. The apparatus of claim 47 wherein the means for providing a control signal also provides a secondary data signal.

* * * * *